United States Patent [19]

Nicholson, Jr.

[11] Patent Number: 5,056,732
[45] Date of Patent: Oct. 15, 1991

[54] SPOOL WINDING APPARATUS

[76] Inventor: William B. Nicholson, Jr., 813 Festoon Ct., Tyler, Tex. 75703

[21] Appl. No.: 539,845

[22] Filed: Jun. 18, 1990

[51] Int. Cl.⁵ .............................................. B65H 75/30
[52] U.S. Cl. ..................................... 242/106; 242/96; 242/129.5
[58] Field of Search ..................... 242/47, 60, 61, 62, 242/67.1 R, 96, 100, 68.3, 106, 84.8, 86.5 R, 86.5 A, 129.5, 129.7, 129.71, 129.72, 86

[56]     References Cited
       U.S. PATENT DOCUMENTS

| | | | |
|---|---|---|---|
| 124,178 | 2/1872 | Walter | 242/100 |
| 584,315 | 6/1897 | Amundson | 242/100 |
| 590,940 | 9/1897 | Ayer | 242/100 |
| 782,882 | 2/1905 | Stolhandske . | |
| 1,111,489 | 9/1914 | Palmer | 242/100 |
| 1,862,611 | 6/1932 | Swearingen . | |
| 2,063,662 | 12/1936 | Doherty | 242/100 |
| 2,434,479 | 1/1948 | Allen . | |
| 2,571,175 | 10/1951 | Williams et al. | 242/60 |
| 2,692,093 | 10/1954 | Tengesdal . | |
| 3,044,732 | 7/1962 | Simonds | 242/96 |
| 3,312,418 | 4/1967 | Haddock . | |
| 3,647,155 | 3/1972 | Jorgenson . | |
| 4,101,090 | 7/1978 | Wait, Jr. . | |
| 4,540,136 | 9/1985 | Rauch . | |
| 4,717,086 | 1/1988 | Crow . | |
| 4,728,048 | 3/1988 | Batson . | |
| 4,732,345 | 3/1988 | Golden | 242/86 |
| 4,762,286 | 8/1988 | Crow . | |

Primary Examiner—John M. Jillions
Attorney, Agent, or Firm—Crutsinger & Booth

[57]     ABSTRACT

In accordance with the invention, a cable winding apparatus is provided which includes a stand, a race on the stand, a manually rotatable handle including a clutch having a mating surface for engaging and rotatably driving a spool positioned between the handle and the race, and a spindle releasably and rotatably connecting the race and the handle. In one embodiment, the race is contained upon one end of a removable plug that fits into a socket in the stand, said plug being reversible with an alternative nonidentical race on the opposite end. The race can be conic, hemispherical or bulbous or have stepped concentric circles. The clutch may include conical or right cylindrical external or internal mating surfaces or teeth and may include adapters having similar surfaces engageable therewith for mating with different sized reels.

20 Claims, 1 Drawing Sheet

SPOOL WINDING APPARATUS

This invention relates to a device for winding line onto a spool and relates more particularly to an apparatus for winding plastic line such as nylon monofilament string onto a non-metallic spool for use in a hand-held string trimmer.

BACKGROUND OF THE INVENTION

Hand-held string trimmers are commonly used in lawn and yard maintenance both by home owners and professionals. Such trimmers commonly include an electric motor or gasoline engine that rotates a hub from which a string projects. The string is held away from the hub by centrifugal force resulting from the rotation of the hub. Contact of the rapidly moving string with vegetable matter such as grasses or weeds severs the grasses or weeds at the point of contact. The operator controls this cutting action by manually guiding the string trimmer.

The string used by the trimmer is commonly a nylon or other non-metallic monofilament and is worn away by contact with the vegetable matter or other matter such as pavement. Therefore, many string trimmers include a supply of string to replenish the worn away portion of the string projecting from the hub. Such string trimmers commonly contain a semi-automatic or manual mechanism for advancing additional string from the supply to replace that string worn away outside the hub.

However, even in those string trimmers containing an additional supply of string, the supply is eventually exhausted. New string trimmers are commonly sold with a supply of string already installed. When such supply is exhausted, the operator must replenish the supply.

The supply of string is commonly wound upon a removable and replaceable hard plastic spool. The simplest way to replenish the supply of string is to purchase a replacement spool with a new supply of string thereon and substitute this new spool for the empty spool. Prewound replacement spools are available and can be purchased; however, they are more expensive than the string alone, since they require the replacement of the otherwise reusable but empty spool. Therefore, this method, although simple, faces the disadvantage of high cost.

Bulk string is also available and the trimmer operator may reload his empty spool for continued use of the string trimmer. The operator may leave the empty spool on the trimmer and wind the string about the spool. However, this method may twist the string as it is wound onto the spool, potentially causing the string to jam and not advance to replace worn string during subsequent operation of the tool.

The spool may also be removed from the trimmer and rotated by hand to wind string onto it; however, this method is quite awkward and slow.

Thus, there is a need for a device to which an empty spool can be mounted to wind replacement string onto the empty reusable spool. However, there is very little commonality in the sizes of the various spools offered by differing manufacturers and even among different models offered by the same manufacturer. Therefore, such a device must be able to adapt to the various different sizes and driving mechanisms of the various possible spools available.

Various spool winding devices have been developed. For example, Crow U.S. Pat. No. 4,762,286 discloses a spool rewinder in which a spool is held against a frame by a manually rotatable, spring-biased gripping plate. Prongs on this gripping plate engage cooperative openings in the spool to rotate it when the plate is rotated.

Batson U.S. Pat. No. 4,728,048 discloses a spool winding device that is adaptable for use as a power drill attachment. In the Batson device, the spool is held about a shaft between a cone member and a ring member by a biasing spring that urges the ring member toward the cone member. The entire apparatus may be rotated by an electric drill. A similar device is available from Briarwood Industries, P.O. Box 1859, Kilgore, Tex. 75662.

Crow U.S. Pat. No. 4,717,086 also discloses a spool rewinder in which a spool placed about a manually rotatable shaft is held against a shoulder by a compressible disk urged against the opposite side of the spool. This patent also discloses the device of the above mentioned Crow U.S. Pat. No. 4,762,286.

Other devices have been developed for winding fishing line onto spools or reels. Rauch U.S. Pat. No. 4,540,136 discloses a fishing line loader apparatus in which a spool may be mounted on a manually rotatable shaft between two disks, one of which is provided with an elastomeric bearing surface to restrict rotation of the spool relative to the shaft.

Jorgensen U.S. Pat. No. 3,647,155 discloses a winding device for transferring fishing line from a storage spool to a spool of a fishing reel in which a reel is clamped between two opposed cone-shaped plugs which are fixedly retained on a manually rotatable shaft passing through the center of the plugs and the reel.

Haddock U.S. Pat. No. 3,312,418 discloses a fishing line applicator for holding a supply reel while the line is wound onto the fishing reel by that reel's own winding mechanism. The device mounts to and rotates with a revolving pickup cylinder of the reel.

Tengesdal U.S. Pat. No. 2,692,093, and Stolhandske U.S. Pat. No. 782,882 disclose hand held fishing line reels Allen U.S Pat. No. 2,434,479 discloses a hand held fishing line reel assembly for use without a rod in which the two sides of the reel are cone shaped rather than parallel.

Wait, Jr. U.S. Pat. No. 4,101,090 discloses a reel structure for retrieving and discharging line with multiple diameter hubs and means for steadying the reel structure against the body of the operator. Swearingen U.S. Pat. No. 1,862,611 discloses a hand reel.

In view of the foregoing, it is an object of this invention to provide a spool winding apparatus that will easily transfer non-metallic line to a removable and reusable spool such as is used in a string trimmer.

It is a further object of this invention to provide a spool winding apparatus that will adapt to various sizes of string trimmer spools provided by the various manufacturers and models of such string trimmers.

It is yet a further object of this invention to provide a spool winding apparatus that will transfer non-metallic line to a spool with minimal twisting and kinking of the non-metallic line.

SUMMARY OF THE INVENTION

In accordance with the invention, a cable winding apparatus is provided which includes a stand, a race on the stand, a manually rotatable handle including a clutch having a mating surface for engaging and rotatably driving a spool positioned between the handle and the race, and a spindle releasably and rotatably connecting the race and the handle. In one embodiment, two dissimilar races are integrally provided on opposing sides of the stand coaxially about the spindle and the user may select between them by reversing the spindle. In a second embodiment, the race is contained upon one end of a removable plug that fits into a socket in the stand, said plug being reversible with an alternative nonidentical race on the opposite end. The race can be conic, hemispherical or bulbous or have stepped concentric circles. The clutch may include conical or right cylindrical external or internal mating surfaces or teeth and may include adapters having similar surfaces engageable therewith for mating with different sized reels.

BRIEF DESCRIPTION OF THE DRAWINGS

Other objects and advantages of the invention will become apparent upon reading the following detailed description and upon reference to the drawings, in which.

While the invention will be described in connection with particular embodiments, it will be understood that the description is not intended to limit the invention to those embodiments On the contrary, the description is intended to cover all alternatives, modifications and equivalences may be included within the spirit and scope of the invention as defined by the appended claims.

DETAILED DESCRIPTION OF THE INVENTION

Figure 1:
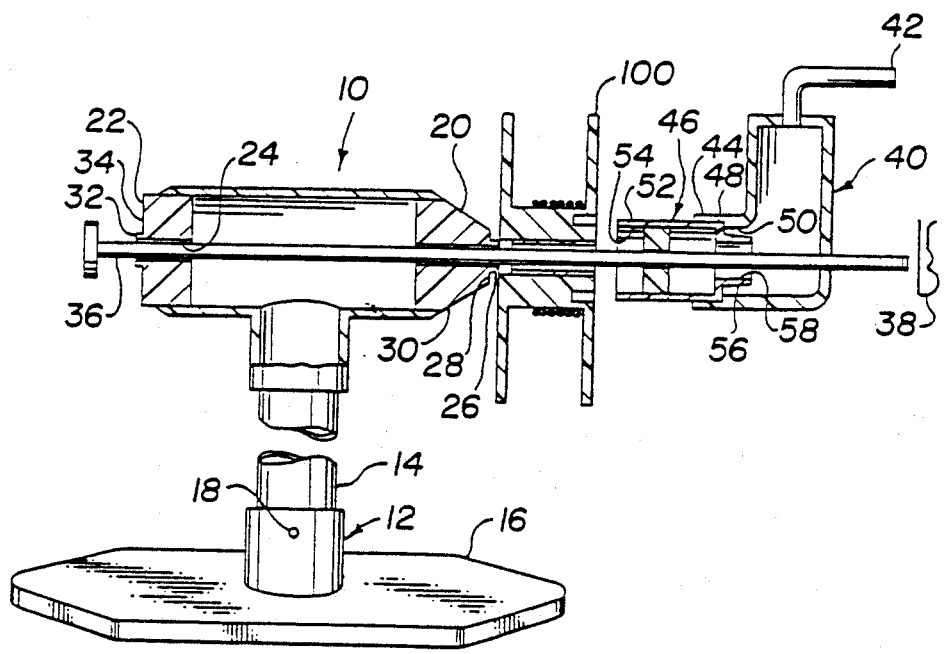
FIG. 1 is an elevation of one embodiment of the spool winding apparatus of the invention.

Turning now to the drawings and first to FIG. 1, there is shown a spool winding apparatus 10. The apparatus 10 includes a stand 12 having an upright portion 14 and a flat base portion 16. The base portion 16 may be separable from the upright portion 14 for storage and reassembled for use. Alternating the separated upright portion 14 without the base portion 16 may be hand held by the user or mounted as by a bracket, to a fixed surface such as a workbench or a lawn maintenance service's truck. A removable pin may be inserted through cooperative holes 18 in the upright portion 14 and flat base portion 16 to secure them in their assembled position. The stand 12 of FIG. 1 is shaped so that it will be stable and may be held with the upright portion 14 between the knees of a seated user and with the flat base portion 16 beneath the user's thighs.

The uppermost end of the stand 14 is provided with a first race 20 and a second race 22, both concentric with and surrounding opposite ends of a central bore 24. The first race 20 includes a pair of concentric circular surfaces 26 and 28 with the larger such surface 28 surrounding and recessed slightly behind the smaller diameter surface 26. The larger concentric circular surface 28 is itself surrounded by a frustoconical surface 30.

Similarly, the second race 22 includes a pair of concentric circular surfaces 32 and 34. Surface 32 is similarly narrow but preferably of a different diameter than either of circular surfaces 26 and 28. Concentric surface 34 is recessed from surface 32 but is much wider. The stand 14 may alternatively be provided with a race or races having shapes different from those shown in FIG. 1, such as, for example, those shown in FIG. 2.

As stated above, both races 20 and 22 are provided at opposite ends of the central bore 24. This common bore permits the insertion of spindle 36 in either direction so that the spindle 36 can project from either the face of the first bore 20 or of the second bore 22 as may be desired by the operator.

A spool 100 may be placed over the projecting spindle 36, followed by a handle 40 which is also placed over the projecting spindle 36. A hairpin clip 38 or other device is then placed about the spindle 36, which may be externally threaded, notched, pierced or otherwise rendered adjustable to adjustably accommodate spools of differing thicknesses and secure the handle 40 to the device. The handle 40 is provided with a crank 42 which permits the handle 40 to be rotated about the axis formed by the spindle 36. The handle is also provided with a clutch 44 and optionally with a clutch adapter 46, as shown in FIG. 1. The clutch 44 and clutch adapter 46 are provided with mating surfaces thereon for engaging with a friction fit various size spools 100 that may be rewound with the spool winding apparatus. The clutch 44 is provided with an external right cylindrical mating surface 48 and an internal right cylindrical mating surface 50, either of which may engage and rotate an appropriate spool by a friction fit.

However, the spool 100 shown in FIG. 1 is not of a size appropriate for engagement by the clutch 44. Therefore, the clutch adapter 46 is used. This clutch adapter 46 is provided with an external right cylindrical mating surface 52 which has approximately the same diameter as the diameter of the internal right cylindrical mating surface 50 of the clutch. Thus, these mating surfaces 50 and 52 may be engaged in a friction fit and rotation of the handle 40 by the crank 42 will rotate the clutch adapter 46. The clutch adapter is also provided with an internal right cylindrical mating surface 54 and, on its opposite end, with external right cylindrical mating surface 56 and internal right cylindrical mating surface 58, each having different diameters from the other mating surfaces provided. These latter two mating surfaces may be engaged with a spool by reversing the position of the clutch adapter from the position shown in FIG. 1.

Figure 2:
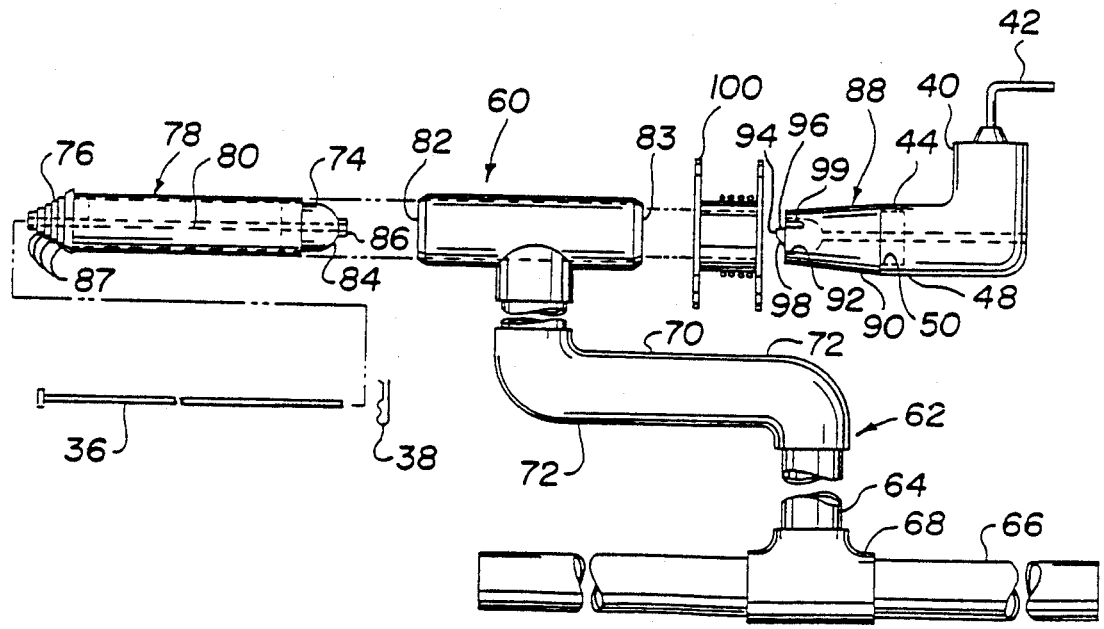
FIG. 2 is an elevation of an alternative embodiment of the spool winding apparatus of the invention.

The handle 40 and clutch adapter 46 shown in FIG. 1 thereby provide three different diameter external right cylindrical mating surfaces and three different diameter internal right cylindrical mating surfaces to engage in a friction fit with six possible different complementary surfaces of spools Turning now to FIG. 2, an alternative spool winding apparatus 60 is provided with certain alternative features. Desired features of the spool winding apparatus 10 and the spool winding apparatus 60 may be combined as desired.

Spool winding apparatus 60 also includes a stand 62 comprising an upright portion 64 and a transverse portion 66 at the lower end of the upright portion 64. Transverse portion 66 however is tubular rather than flat. An operator may hold the stand 62 with the upright portion 64 between his knees and the tubular portion 66 beneath his thighs. When doing so, he is free to rotate the spool winding apparatus 60 about the transverse portion 66 to find the most comfortable or advantageous position. The transverse portion 66 may be removable from and insertable into a tee 68 provided at the lower end of the upright portion 64 or the upright portion 64 may be used without the transverse portion 66 in the same manner as described above for the embodiment shown in FIG. 1. Preferably, the transverse portion 66 is substantially parallel to the spindle 36 described below.

The upright portion 64 is also provided with a crook or offset 70 which forms a guiding surface 72 over or under the line to be wound onto the spool may pass. The operator may hold the stand 62 in his hand and apply palm or finger pressure to the line as it passes over the guiding surface 72 to create an appropriate drag for proper winding of the spool. As will be observed in FIG. 2, the guiding surface 72 is located radially of the spool 100 shown in FIG. 2.

The spool winding apparatus 60 is provided with a first race 74 and a second race 76 on opposite ends of a plug 78 surrounding a concentric bore 80. Plug 78 is reversibly insertable and removable from a socket 82 provided on the upper end of the upright portion 64 of the stand 62. The reversible plug 78 allows either the first race 74 or the second race 76 to be selected and inserted into the end 83 of the socket 82 above the guiding surface 72. Alternatively, the first race 74 and second race 76 may be integral with the upper end of the stand 62, in the manner shown in FIG. 1, with the upper end reversibly connected to the upright portion 64 so that the selected race is mounted above the guiding surface 72 of FIG. 2.

First race 74 illustrates a bulbous race configuration including a hemispheric surface 84 concentrically surrounding a circular surface 86. Other bulbous configurations such as ellipses are also possible shapes for the surface of a race. The second race 76 illustrates a series of concentric circular surfaces 87, each slightly larger and slightly recessed behind its adjacent smaller neighbor. Inserts having races of the shapes illustrated in FIG. 1 may also be provided.

The same spindle 36 and clip 38 and handle 40 illustrated in FIG. 1 may be used and are shown in the embodiment of FIG. 2. As in FIG. 1, the handle 40 includes crank 42 and clutch 44 with the external mating surface 48 and internal mating surface 50 thereon. FIG. 2 also illustrates an alternative clutch adapter 88 including an external frustoconical mating surface 90 and an internal right circular cylindrical mating surface 92. The frustoconical 90 surface is tapered to conform to a frustoconical mating surface of a spool, which commonly range from 0° to 4°, typically about 4°.

The clutch adapter 88 is also provided with a tooth 94 having a driving face 96 opposite a disengaging ramp 98. The tooth 94 engages the surface of a cooperating notch of certain spools. The sloped ramp 98 allows the tooth 94 to be disengaged from the spool by rotating the handle 40 in the reverse direction.

The clutch adapter 88 is also provided with a longitudinal slot 99 to clear the end of the monofilament string which in some spools projects through a hole in the spool hub into the central bore of the spool.

In operation, the spool winding apparatuses 10 and 60 illustrated in FIGS. 1 and 2 are used in substantially the same way. The appropriate race is selected and if necessary inserted into the socket of the spool winding apparatus. The spindle is then inserted through the concentric central bore in the race and the spool is placed over the spindle. A clutch adapter is selected if necessary for proper engagement with the spool and assembled to the handle. Then the handle, with the clutch adapter if selected, is placed over the spindle and into a frictional rotational engagement with the spool. The clip is placed on the spindle to retain the handle. The operator may hold the spool winding apparatus in one hand or between his knees and rotate the crank of the handle with his other hand in the appropriate direction to wind string onto the spool, creating drag on the string with his hands as applied to the guiding surface if desired.

Thus, it is apparent that there has provided, in accordance with the invention, a spool winding apparatus that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A spool winding apparatus, comprising
    a stand;
    a race on the stand;
    a manually rotatable handle including a clutch having a mating surface for engaging and rotatably driving a spool positioned between the handle and the race; and
    a spindle releasably and rotatably connecting the race and the handle.

2. The spool winding apparatus of claim 1 wherein the stand includes a socket and further wherein the race forms a removable plug that may be inserted into the socket of the stand.

3. The spool winding apparatus of claim 2 wherein the plug has two ends and each end includes a race and the plug is reversibly insertable into the socket.

4. The spool winding apparatus of claim 3 wherein the races on the opposed ends of the plug are nonidentical.

5. The spool winding apparatus of claim 2 wherein the plug is rotatable within the socket.

6. The spool winding apparatus of claim 2 wherein the plug includes a bore therethrough for receiving the spindle and the spindle is rotatable with respect to the plug when the spindle is received within the bore.

7. The spool winding apparatus of claim 1 wherein the race includes a plurality of concentric circular surfaces.

8. The spool winding apparatus of claim 1 wherein the race includes a right circular frustoconical surface.

9. The spool winding apparatus of claim 1 wherein the race includes a hemispherical surface.

10. The spool winding apparatus of claim 1 wherein the race includes a bulbous surface.

11. The spool winding apparatus of claim 1 wherein the mating surface of the clutch includes a frustoconical surface.

12. The spool winding apparatus of claim 1 wherein the mating surface of the clutch includes an external right circular cylindrical surface.

13. The spool winding apparatus of claim 1 wherein the mating surface of the clutch includes an internal right circular cylindrical surface.

14. The spool winding apparatus of claim 1 wherein the mating surface of the clutch includes a cylindrical surface having a longitudinal slot therein.

15. The spool winding apparatus of claim 1 wherein the clutch includes a mating surface and further includes a tooth projecting from an end of the clutch.

16. The spool winding apparatus of claim 1 further including a clutch adapter receivable within the clutch for rotation with the rotation of the clutch, said clutch adapter including a mating surface for engaging and rotatably driving a spool located between the clutch adapter and the race.

17. The spool winding apparatus of claim 1 wherein the handle includes a crank.

18. The spool winding apparatus of claim 1 wherein the stand includes a guide surface located radially of a hub of a spool that is positioned between the race and the handle.

19. The spool winding apparatus of claim 1 wherein the stand includes an upright portion and a flat base with said upright portion being substantially perpendicular to said flat base portion.

20. The spool winding apparatus of claim 1 wherein the stand includes an upright portion and a transverse portion with the transverse portion being substantially parallel to the spindle.

* * * * *